(No Model.)
M. SWENSON.
DIFFUSION BATTERY.
No. 430,976. Patented June 24, 1890.
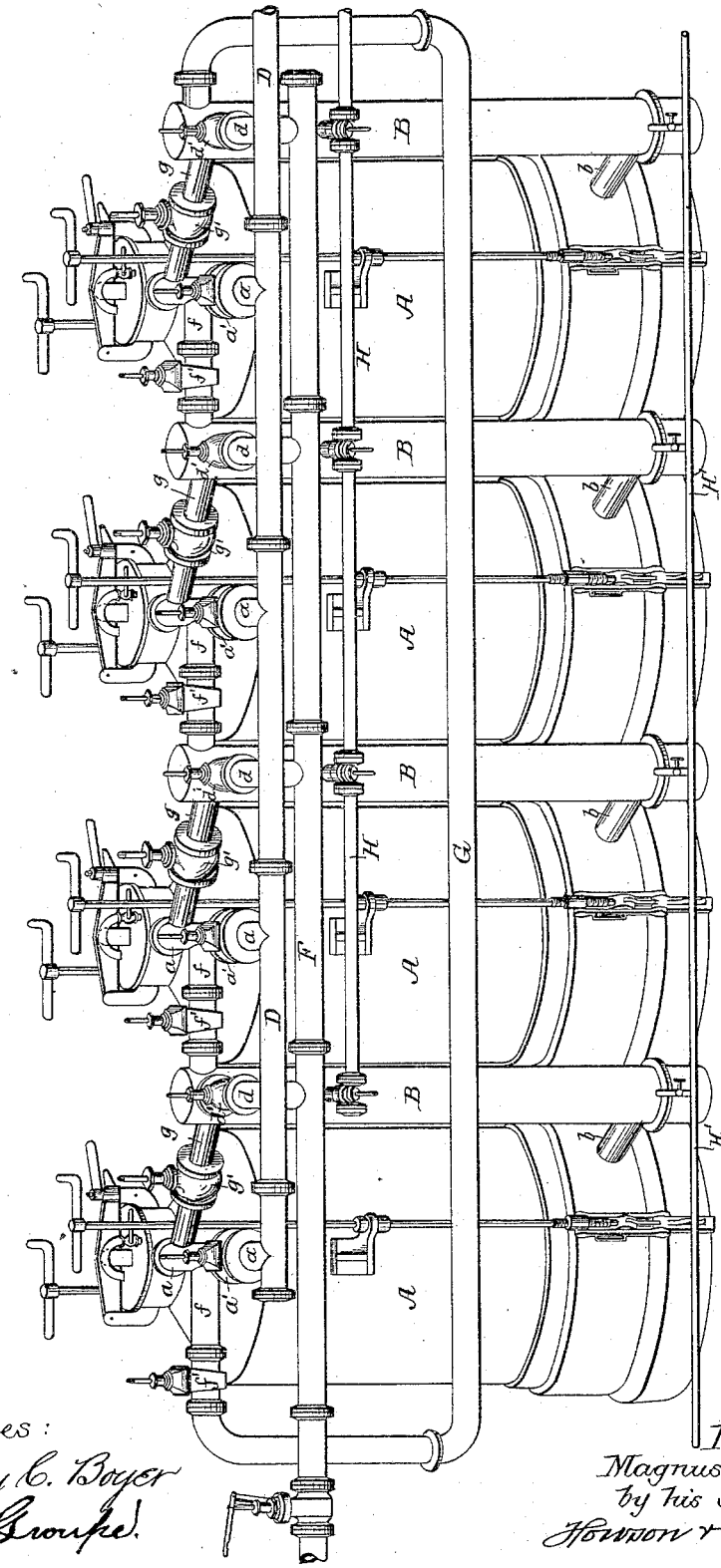
Witnesses:
Murray C. Boyer
A. V. Groupe
Inventor:
Magnus Swenson
by his Attorneys
Howson & Howson

UNITED STATES PATENT OFFICE.

MAGNUS SWENSON, OF FORT SCOTT, KANSAS, ASSIGNOR OF ONE-HALF TO ALBERT W. WALBURN, OF SAME PLACE.

DIFFUSION-BATTERY.

SPECIFICATION forming part of Letters Patent No. 430,976, dated June 24, 1890.

Application filed February 14, 1890. Serial No. 340,447. (No model.)

*To all whom it may concern:*

Be it known that I, MAGNUS SWENSON, a citizen of the United States, and a resident of Fort Scott, Bourbon county, Kansas, have invented certain Improvements in Diffusion-Batteries, of which the following is a specification.

The objects of my invention are to provide for heating the water or juice in a diffusion-battery to a higher temperature than is possible with the present system of cells, heaters, and circulating-pipes, and to prevent the chilling of the contents of the cells and consequent liability to fermentation in case of a temporary stoppage in the operation of the battery. These objects I attain by providing for an independent circulation of water or juice through each cell and its heater, so that a circulation through the independent cells and their heaters can, when desired, be maintained and the necessity of causing the juice to flow through the successive cells of the entire battery avoided.

In the accompanying drawing, the figure represents four cells of a diffusion-battery with heaters and circulating-pipes as usual, and also illustrating my improvement applied to the battery.

Of course it will be understood that in practice the battery comprises a greater number of cells than four, this number being shown in the drawing simply for convenience and in order to illustrate the parts on a large scale within the necessary limits.

A represents the cells of the battery, and B the heaters, one for each cell; D, the water-supply pipe; F, the juice-pipe; G, the return-pipe; H, the pipe for supplying steam to the heaters, and H' the drainage-pipe for said heaters.

The water-supply pipe D communicates with the upper portion of each cell A through a branch $a$, having a valve $a'$. The lower portion of each cell communicates through a branch $b$ with the bottom of its respective heater, and the upper portion of each heater communicates with the juice-pipe F through a branch $d$, having a valve $d'$, the upper end of the heater of one cell also communicating with the supply branch $a$ of the next successive cell of the battery through a pipe $f$, having a valve $f'$. The return-pipe extends from the heater of the last cell of the battery to the supply branch $a$ of the first cell and is provided with a valve $f'$. The water, after passing through the chips in the first cell of the series, enters the heater, has its temperature raised in passing through the same, and then enters the upper portion of the second cell of the series, after passing through which it rises in the second heater, enters the third cell, and so on, the juice being discharged into the juice-pipe from the upper end of the heater of the last cell of the series. There is a connection between each of the cells and the water-pipe and juice-pipe, because each one of the cells becomes at some time in the operation of the battery the first of the series and at another time the last of the series; but this is the ordinary arrangement of a diffusion-battery, and I make no special claim to the parts described. In working such a battery, however, difficulty is experienced in maintaining the proper degree of heat in the juice, especially just before it is delivered, because the cell of the battery which for the time being constitutes the last cell of the series is the one which has just been filled with fresh chips, so that the temperature of the juice discharged from this cell is the mean temperature between that of the juice and that of the cold chips. Furthermore, in a battery of this character the only means of keeping up the temperature when there is a temporary stoppage in the regular working of the battery is by passing the juice through the cells of the battery successively.

My invention consists in connecting the upper end of each heater not only with the supply branch of the next cell of the battery, but also with the supply branch of its own cell, such connection in the battery shown in the drawing being effected by means of a pipe $g$, having a valve $g'$. It will therefore be seen that by closing the valves $f'$ and opening the valves $g'$ the juice from each cell, after rising through the heater, is returned to the top of the same cell from which it issued, so that a continuous circulation through each cell and its heater independent of the others can be maintained and a temperature approaching that of the steam in the heater can be imparted to the juice; hence the chilling of the apparatus in case of a temporary stoppage is effectually prevented, and the juice can be delivered from the last cell of a series at a high temperature, so that it can be run directly into the defecating-pans for immediate treatment therein.

By passing the juice repeatedly through the same cell, moreover, the suspended matter contained in the juice is gradually deposited upon the top of the chips contained in the cell, so that the charge of chips serves as a filter for the juice and clarifies the same before it is discharged through the juice-pipe.

Having thus described my invention, I claim and desire to secure by Letters Patent—

The combination of the cells and heaters of a diffusion-battery with valved pipes connecting the upper portion of each heater with the succeeding cell of the series and also with its own cell, whereby a circulation through the independent cells and their heaters is permitted, as well as a circulation through the cells and heaters of the battery in succession, substantially as specified.

In testimony whereof I have signed my name to this specification in the presence of two subscribing witnesses.

MAGNUS SWENSON.

Witnesses:
A. W. WALBURN,
J. H. GIBSON.